(12) United States Patent
Yamaguchi

(10) Patent No.: US 7,652,106 B2
(45) Date of Patent: Jan. 26, 2010

(54) RESIN COMPOSITION CONTAINING POLY-3-HYDROXYBUTYRATE POLYMER, AND METHOD FOR PRODUCING THE SAME

(75) Inventor: Masayuki Yamaguchi, Nomi (JP)

(73) Assignee: Tosoh Corporation, Yamaguchi (JP)

( * ) Notice: Subject to any disclaimer, the term of this patent is extended or adjusted under 35 U.S.C. 154(b) by 201 days.

(21) Appl. No.: 11/260,216

(22) Filed: Oct. 28, 2005

(65) Prior Publication Data

US 2006/0106162 A1    May 18, 2006

(30) Foreign Application Priority Data

Nov. 12, 2004 (JP) .................. P. 2004-328804
Nov. 12, 2004 (JP) .................. P. 2004-328805

(51) Int. Cl.
*C08G 18/28* (2006.01)

(52) U.S. Cl. .................. 525/440.13; 524/296

(58) Field of Classification Search .................. 525/419, 525/440.13; 524/296
See application file for complete search history.

(56) References Cited

U.S. PATENT DOCUMENTS

| 4,978,725 | A | 12/1990 | Reske et al. |
| 5,262,642 | A | 11/1993 | Wessels et al. |
| 5,939,467 | A * | 8/1999 | Wnuk et al. ............. 523/128 |
| 6,803,443 | B1 | 10/2004 | Ariga et al. |
| 2003/0191210 | A1* | 10/2003 | Autran ..................... 523/105 |
| 2004/0063824 | A1 | 4/2004 | Takagi et al. |

FOREIGN PATENT DOCUMENTS

| CN | 1487976 A | 4/2004 |
| EP | 1 445 282 A1 | 8/2004 |

OTHER PUBLICATIONS

Ooono, CAPLUS AN 1998:580265, abstracting JP 10233125, Sep. 1998.*
Study on modification of biodegradable poly(3-hydroxybutyrate) with dioctyl phthalate, China Synthetic Resin and Plastics (2004), vol. 21, pp. 52-55, English abstract.
Chinese Office Action dated Feb. 9, 2007, English translation.
Patent Abstracts of Japan—JP-A-03-124764 (1991), Derwent Publications Ltd., vol. 15, No. 328.
European Search Report dated Jan. 12, 2006.

* cited by examiner

*Primary Examiner*—Jeffrey C Mullis
(74) *Attorney, Agent, or Firm*—Sughrue Mion, PLLC

(57) ABSTRACT

A resin composition having excellent impact resistance and heat resistance, comprising a poly-3-hydroxybutyrate, and a core-shell latex rubber comprising an acrylic rubber and/or silicone-acrylic rubber copolymer as a core component and polymethyl methacrylate as a shell component, or a specific thermoplastic polyurethane, is disclosed. The resin composition satisfies the following requirements (c) and (d):

(c) a crystallization temperature when heated from room temperature to 180° C. at a temperature rising rate of 80° C./min by a differential scanning calorimeter, maintained at 180° C. for 1 minute, and then cooled at a temperature lowering rate of 10° C./min is 110-170° C.; and (d) a weight average molecular weight (Mw) in terms of polystyrene conversion when a chloroform soluble component is measured with a gel permeation chromatography is 100,000-3,000,000.

5 Claims, No Drawings

RESIN COMPOSITION CONTAINING POLY-3-HYDROXYBUTYRATE POLYMER, AND METHOD FOR PRODUCING THE SAME

FIELD OF THE INVENTION

The present invention relates to a resin composition comprising a poly-3-hydroxybutyrate polymer, and a core-shell latex rubber or a thermoplastic polyurethane, and a method for producing the resin composition. More particularly, the present invention relates to a poly-3-hydroxybutyrate polymer resin composition having excellent impact resistance and heat resistance, and a method for producing the resin composition.

BACKGROUND ART

Poly-3-hydroxybutyrate polymers are obtained using plants as a raw material, and therefore are recently noted as a material having small environmental load. However, the poly-3-hydroxybutyrate polymers have the problem of having poor impact resistance.

To overcome this problem, a method of mixing polycaprolactone or polybutyrene succinate resin is proposed as described in, for example, JP-A-9-194281 and JP-A-11-323141.

However, in the method of mixing a different kind of polymer as proposed in the above-described patent publications, a composition thus obtained does not have sufficient impact resistance, and further has poor heat resistance.

SUMMARY OF THE INVENTION

The present invention has been made in view of the above-described disadvantages in the prior art.

Accordingly, one object of the present invention is to provide a resin composition having excellent heat resistance and impact resistance, comprising a poly-3-hydroxybutyrate polymer, and a core-shell latex rubber or a thermoplastic polyurethane.

Another object of the present invention is to provide a method for producing the resin composition.

As a result of extensive investigations to overcome the disadvantages in the prior art, it has been found that a resin composition comprising a poly-3-hydroxybutyrate polymer, and a specific core-shell latex rubber or a specific thermoplastic polyurethane exhibits excellent impact resistance and heat resistance. The present invention has been completed based on this finding.

According to the present invention, there is provided a resin composition comprising:

50-99% by weight of a poly-3-hydroxybutyrate polymer, and 50-1% by weight of i) a core-shell latex rubber comprising an acrylic rubber and/or a silicone-acrylic rubber copolymer as a core component, and a polymethyl methacrylate as a shell component, or (ii) a thermoplastic polyurethane satisfying the following requirements (a) and (b):

(a) a glass transition temperature when heated from −100° C. at a temperature rising rate of 10° C./min by a differential scanning calorimeter is −30 to −50° C.; and (b) JIS A surface hardness is 60-95, the resin composition satisfying the following requirements (c) and (d):

(c) a crystallization temperature when heated from room temperature to 180° C. at a temperature rising rate of 80° C./min by a differential scanning calorimeter, maintained at 180° C. for 1 minute, and then cooled at a temperature lowering rate of 10° C./min is 110-170° C.; and (d) a weight average molecular weight (Mw) in terms of polystyrene conversion when a chloroform soluble component is measured with a gel permeation chromatography is 100,000-3,000,000.

According to the present invention, there is further provided a method for producing a resin composition comprising:

melt mixing 50-99% by weight of a poly-3-hydroxybutyrate polymer, and 50-1% by weight of i) a core-shell latex rubber comprising an acrylic rubber and/or a silicone-acrylic rubber copolymer as a core component, and a polymethyl methacrylate as a shell component, or (ii) a thermoplastic polyurethane satisfying the following requirements (a) and (b):

(a) a glass transition temperature when heated from −100° C. at a temperature rising rate of 10° C./min by a differential scanning calorimeter is −30 to −50° C.; and (b) JIS A surface hardness is 60-95, with an extruder, and
discharging the resulting molten mixture from a die at a molten resin temperature of 160-185° C.

DETAILED DESCRIPTION OF THE INVENTION

The present invention is described in detail below.

The poly-3-hydroxybutyrate polymer (hereinafter referred to as "PHB polymer" for brevity) used in the present invention is described below.

Examples of the PHB polymer that can be used include poly-3-hydroxybutyrate homopolymers and copolymers of 3-hydroxybutyrate and hydroxyalkanoate other than 3-hydroxybutyrate. Where the PHB polymer is a copolymer, examples of the hydroxyalkanoate other than 3-hydroxybutyrate include 3-hydroxypropionate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxyundecanoate, 4-hydroxybutyrate, and hydroxylaurylate. The copolymer is preferably that the hydroxyalkanoate other than 3-hydroxybutyrate is copolymerized in an amount of 25 mol % or smaller from the point that a resin composition having particularly excellent molding processability is obtained.

The PHB polymer preferably used is poly-3-hydroxybutyrate homopolymers, 3-hydroxybutyrate/3-hydroxyvalerate copolymers, and 3-hydroxybutyrate/4-hydroxybutyrate copolymers from the point that those are easily available.

Further, the PHB polymer is preferably produced in microorganisms in that a resin composition obtained has excellent molding processability. Such PHB polymers are commercially available. Production method of the PHB polymers is disclosed in, for example, U.S. Pat. No. 4,477,654, WO 94/11519, and U.S. Pat. No. 5,502,273. The PHB polymers can be produced using those methods.

The resin composition according to the present invention uses i) a core-shell latex rubber comprising an acrylic rubber and/or a silicone-acrylic rubber copolymer as a core component, and a polymethyl methacrylate as a shell component, or (ii) a thermoplastic polyurethane satisfying the following requirements (a) and (b):

(a) a glass transition temperature when heated from −100° C. at a temperature rising rate of 10° C./min by a differential scanning calorimeter is −30 to −50° C.; and (b) JIS A surface hardness is 60-95.

The core-shell latex rubber comprises an acrylic rubber and/or a silicone-acrylic rubber copolymer as a core component, and a polymethyl methacrylate as a shell component.

Use of the core-shell latex rubber comprising such components results in a resin composition having excellent heat resistance and impact resistance.

A method for producing the core-shell latex rubber used in the present invention is not particularly limited, and the core-shell latex rubber can be produced by conducting a multistage emulsion polymerization or a multistage seed polymerization, that is known as a production method of general core-shell latex rubbers. In such a case, the core component preferably has an average particle diameter of 0.05-1 μm from the point that a resin composition having excellent impact resistance is particularly obtained. The core-shell latex rubber used in the present invention can be available as commercial products such as METABLEN S-2001 (trade name, a product of Mitsubishi Rayon Co.) or METABLEN W-450A (trade name, a product of Mitsubishi Rayon Co.).

From that the core-shell latex rubber used in the present invention enables the resulting resin composition to have further excellent impact resistance, the core-shell latex rubber is preferably that tensile storage modulus (E') at measurement temperature of 0° C. and measurement frequency of 10 Hz is 1-100 MPa, and temperature showing the maximum value of loss tangent (tan δ) is −50 to 0° C. In such a case, the maximum value of loss tangent preferably exceeds 0.3 from that the resin composition obtained has further improved impact resistance. The tensile storage modulus and loss tangent can be measured with a dynamic viscoelasticity measuring device using a test piece having a thickness of 0.5-2 mm molded by compression molding.

When a ultrathin cut piece of a compression molded test piece is prepared and is observed with a transmission electron microscope, the core-shell latex rubber preferably does not form a continuous phase, and the number of agglomerate having a diameter of 1 μm or larger of the core-shell latex rubber is preferably less than 2 per 100 μm$^2$, from that the resin composition obtained using the core-shell latex rubber exhibits excellent impact resistance and heat resistance.

The thermoplastic polyurethane used in the present invention has the properties that (a) a glass transition temperature when heated from −100° C. at a temperature rising rate of 10° C./min by a differential scanning calorimeter (hereinafter referred to as "DSC" for brevity) is −30 to −50° C.; and (b) JIS A surface hardness is 60-95. Use of such a thermoplastic polyurethane enables the resin composition of the present invention to have excellent impact resistance and heat resistance.

The thermoplastic polyurethane used is not particularly limited so long as it is satisfied with the requirements (a) and (b). From that the resin composition obtained has excellent impact resistance, adipic acid-based thermoplastic polyurethane using adipic acid polyester as a soft segment, polyether-based thermoplastic polyurethane using polyether, polycaprolactone-based thermoplastic polyurethane using polycaprolactone, and polycarbonate-based thermoplastic polyurethane using polycarbonate are preferably used, and adipic acid-based thermoplastic polyurethane using ethylene glycol and/or butylene glycol as adipic acid ester of a soft segment is particularly preferably used.

Such thermoplastic polyurethanes can be available as commercial products such as MIRACTRAN E190, MIRACTRAN E385 and MIRACTRAN E585, trade names, products of Nippon Miractran Co., Ltd.

Preferably, a sea-island structure is formed in the resin composition such that the PHB polymer forms a continuous phase and the thermoplastic polyurethane forms a disperse phase, form that the resin composition obtained using such a thermoplastic polyurethane exhibits excellent heat resistance. The disperse phase preferably has an average particle diameter of 0.1-3 μm from that further excellent impact resistance is exhibited.

The resin composition according to the present invention comprises 50-99% by weight of the PHB polymer and 50-1% by weight of the core-shell latex rubber or thermoplastic polyurethane, preferably 60-95% by weight of the PHB polymer and 40-5% by weight of the core-shell latex rubber or thermoplastic polyurethane, and more preferably 65-90% by weight of the PHB polymer and 35-10% by weight of the core-shell latex rubber or thermoplastic polyurethane. Where the weight proportion of the core-shell latex rubber or thermoplastic polyurethane is less than 1% by weight, the resin composition obtained has poor impact resistance. On the other hand, where the weight proportion exceeds 50% by weight, the resin composition obtained has poor heat resistance.

The resin composition according to the present invention is satisfied with the requirement that a crystallization temperature when heated from room temperature to 180° C. at a temperature rising rate of 80° C./min by a differential scanning calorimeter (DSC), maintained at 180° C. for 1 minute, and then cooled at a temperature lowering rate of 10° C./min is 110-170° C. The crystallization temperature is preferably 115-160° C., and more preferably 120-150° C. Where the crystallization temperature is lower than 110° C., the resin composition obtained has low crystallization rate, resulting in poor production efficiency when forming a molded article. On the other hand, the crystallization temperature exceeds 170° C., it is practically difficult to form a resin composition. The crystallization temperature used herein means the highest temperature in peak temperatures of heat flux based on crystallization observed when 5 mg of a sample is placed on an aluminum pan, the pan is heated from room temperature to 180° C. at a temperature rising rate of 80° C./min, the pan is maintained at 180° C. for 1 minute, and the pan is cooled at a temperature lowering rate of 10° C./min, in measurement by DSC (trade name: DSC-7, a product of Perkin Elmer Co.).

The resin composition according to the present invention has a weight average molecular weight (hereinafter referred to "Mw" for brevity) 100,000-3,000,000, and preferably 120,000-1,000,000, in terms of polystyrene conversion when a chloroform soluble component is measured with a gel permeation chromatography (hereinafter referred to as "GPC" for brevity). Where Mw is less than 100,000, the resin composition obtained has poor mechanical strength. On the other hand, where Mw exceeds 3,000,000, the resin composition obtained has poor molding processability. Mw of the chloroform soluble component in resin composition can be measured by dissolving a resin composition or its molded article in chloroform at 60° C. for 2 hours, and measuring a molecular weight of the soluble component obtained. Mw in the present invention is measured in a manner such that GPC device equipped with two columns (trade name: TSKgel GMHHR-H, a product of Tosoh Corporation) is used, a sample prepared under the conditions of measuring solvent: chloroform, measuring temperature: 40° C., sample dissolving conditions: 60° C. and 2 hours, and measuring concentration: 50 mg/50 ml is injected in an amount of 100 μl, and a column eluation volume is corrected using a standard polystyrene (a product of Tosoh Corporation).

The resin composition according to the present invention preferably further comprises a phthalic acid-based plasticizer in an amount of 0.1-30 parts by weight per 100 parts by weight of the sum of the PHB polymer, and the core-shell latex rubber or the thermoplastic polyurethane. Preferable phthalic acid-based plasticizer is a compound that lowers a crystalline melting point of the PHB polymer 3° C. or more. The phthalic acid-based plasticizer used is not particularly limited, and examples thereof include diethyl phthalate, dibutyl phthalate, di-2-ethylhexyl phthalate (DOP), dibutylbenzyl phthalate, and dimethylcylohexyl phthalate. Those may be used alone or as mixtures of two or more thereof.

The resin composition can have the form such as pellet form, powder form or bulk form. Of those, pellet form is preferable from the standpoints of excellent production efficiency in its production and excellent handleability in molding processing. Examples of a method of forming a pellet form include a strand cut method which cuts strand-shaped molten granulates with a strand cutter, an underwater cut method which cuts a molten resin in water, a hot cut method which cuts a molten resin directly or after cooling the same with, for example, mist, and a sheet palletizing method which cuts sheet-like molten granulates with a sheet pelletizer. Of those, the strand cut method, underwater cut method and hot cut method are preferably used in that pellets having good intermesh of a resin in extrusion molding are obtained.

The production method of the resin composition of the present invention can use any method and apparatus so long as the PHB polymer, and the core-shell latex rubber or the thermoplastic polyurethane can be mixed. Of those methods, a production method of using a kneader in which temperature of a molten resin discharged from a die of an extruder is set to 160-185° C. is preferably used from the standpoint that a resin composition having excellent molding processability is obtained. The kneader used is not particularly limited, and examples of the kneader include a co-rotating twin-screw extruder, a counter-rotating twin-screw extruder such as a conical twin-screw extruder, a batch type mixer such as Banbury mixer or a pressure kneader, and a roll kneader. Of those, a counter-rotating twin-screw extruder equipped with a strong kneading type screw such as kneading disc is preferably used from the standpoint that a composition showing excellent impact resistance and heat resistance is obtained.

In producing the resin composition of the present invention, the PHB polymer, and the core-shell latex rubber or the thermoplastic polyurethane are desirably dried beforehand. The drying conditions are not particularly limited. For example, in molding and processing the resin composition of the present invention, the resin composition is desirably dried beforehand. The drying conditions are optional, and for example, the resin composition is preferably dried at a temperature of 40-90° C. for about 30 minutes to about 3 days.

A method for molding the resin composition of the present invention is not particularly limited, and examples of the molding method include odd-shaped extrusion molding, film molding, sheet molding, blow molding, injection molding, expansion molding, extrusion coating, and rotary molding. Of those, the preferable method is injection molding. In conducting the injection molding, when temperature of a molten resin is 230° C. or lower, preferably 210° C. or lower, time required for crystallization in a mold becomes short, making it possible to shorten molding cycle.

The resin composition of the present invention may contain fillers. The fillers added are not particularly limited. Examples of the filler added include inorganic fillers such as calcium carbonate, mica, talc, silica, barium sulfate, calcium sulfate, kaolin, clay, pyroferrite, bentonite, serisanite, zeolite, nepheline syenite, attapulgite, wollastonite, ferrite, calcium silicate, magnesium carbonate, dolomite, antimony trioxide, titanium oxide, iron oxide, molybdenum disulfide, graphite, gypsum, glass beads, glass balloons, glass fibers, quartz, quartz glass or montmorillonite; various plant fibers such as starch, cellulose fibers or kenaf; natural polymers such as wood powders, bean curd refuse, chaff or bran; and organic fillers such as modified products of those natural polymers.

Of those, calcium carbonate and talc have the function to increase crystallization rate, and therefore are preferably used. Talc is particularly preferably used. To increase dispersibility of the fillers into the resin composition, surface-modified calcium carbonate, talc and clay can be used. Where the fillers are used, the fillers are preferably used in an amount of 100 parts by weight or less per 100 parts by weight of the resin composition, so that the resin composition having excellent balance in rigidity and impact resistance is obtained.

The resin composition of the present invention may further contain fatty acids, fatty acid esters, aliphatic amides and fatty acid metal salts.

If required and necessary, the resin composition may further contain crystal nucleating agents. By this addition, crystal growing rate is further increased. Examples of the crystal nucleating agent include boron nitride, mica, talc, alumina, calcium hydroxyapatite, aluminum chloride and clay. Of those, talc or boron nitride is preferably used.

If required and necessary, the resin composition may further contain hydrolysis inhibitors represented by carbodiimide, antiblocking agents, release agents, antistatic agents, slip agents, antifogging agents, lubricants, heat stabilizers, ultraviolet stabilizers, light stabilizers, mildew-proofing agents, rust-proofing agents, ion-trapping agents, foaming agents, flame retardants, flame retardant aids or the like. Further, other thermoplastic resins or rubbers, particularly thermoplastic resins called biodegradable resins, may be blended with the resin composition of the present invention.

The resin composition of the present invention is suitably used for housing or structure parts of appliances; automobile exterior parts such as bumper, rocker laces, side laces or overfender; automobile interior parts such as carpets, head liners, door trims or sun visors; and the like.

The resin composition of the present invention has excellent heat resistance and impact resistance, and is therefore useful as various molding materials.

The present invention is described in more detail by reference to the following examples, but it should be understood that the invention is not construed as being limited thereto.

Measurement methods used in the Examples and Comparative Examples are described below.

Measurement of Crystallization Temperature

Crystal growth rate was measured using a differential scanning calorimeter (trade name: DSC-7, a product of Perkin Elmer Co.). 5 mg of a sample was cut from a pellet, and placed on an aluminum pan. The pan was heated from room temperature to 180° C. at a temperature rising rate of 80° C./min, and was maintained at 180° C. for 1 minute. The pan was then cooled at a temperature lowering rate of 10° C./min. The highest temperature in peak temperatures of heat flux based on crystallization was designated as the crystallization temperature.

Measurement of Crystalline Melting Point

Crystalline melting point was measured using a differential scanning calorimeter (trade name: DSC-7, a product of Perkin Elmer Co.). 5 mg of a sample was cut from a pellet, and placed on an aluminum pan. The highest temperature in peak temperatures of heat flux based on crystal melting observed when the pan was heated from room at a temperature rising rate of 10° C./min was designated as the crystalline melting point.

Measurement of Weight Average Molecular Weight

Pellets obtained by granulation were dissolved in chloroform at 60° C. Using a soluble component alone thus obtained, molecular weight was measured with a gel permeation chromatography. The molecular weight thus measured was corrected using a standard polystyrene (a product of Tosoh Corporation) to determine a weight average molecular weight (Mw) in terms of polystyrene conversion. The measurement conditions were as follows.

Device: trade name: HLC8020GPC (a product of Tosoh Corporation)
Solvent: chloroform
Sample dissolving conditions: 60° C., 2 hours
Temperature: 40° C.
Measurement concentration: 50 mg/50 ml
Injection amount: 100 μl
Column: trade name: TSKgel GMHHR-H (a product of Tosoh Corporation); two columns were used.

Measurement of Linear Viscoelasticity of Core-shell Latex Rubber

Temperature dependence of dynamic tensile modulus was measured at tensile mode using a solid viscoelasticity measuring device (trade name: DVE-V4, a product of Rheology Co.). A core-shell latex rubber plate molded in 1 mm thickness with a compression molding machine was cut into a size having a width of 5 mm and a length of 20 mm to obtain test piece. Measuring frequency of liner viscoelasticity was 10 Hz, a temperature rising rate was 2° C./min, and measurement temperature region was from −100° C. to 100° C. Sinusoidal strain was applied at tensile mode. Loss tangent (tan δ) was measured in a range of from −100° C. to 50° C. Tensile storage modulus (E') was also measured at 0° C.

Measurement of Glass Transition Temperature of Thermoplastic Polyurethane

Glass transition temperature of thermoplastic polyurethane was measured using a differential scanning calorimeter (trade name: DSC-7, a product of Perkin Elmer Co.). 5 mg of a sample was cut from a pellet, and placed on an aluminum pan. The pan was heated from −100° C. at a temperature rising rate of 10° C./min to measure the glass transition temperature.

Measurement of Surface Hardness of Thermoplastic Polyurethane

JIS A surface hardness of a thermoplastic polyurethane was measured at 0° C. according to JIS K7311.

Measurement of Izod Impact Strength

Using a notched Izod test piece obtained by injection molding, Izod impact strength was measured at 23° C. according to ASTM D256. Impact was applied from a notch side. Injection molding was conducted using an injection molding machine (trade name: IS 100E, a product of Toshiba Machine Plastics Engineering Co.) under the conditions of nozzle temperature: 175° C., injection time: 10 seconds and mold temperature: 60° C.

Observation of Phase Structure

A resin composition was compression molded under the conditions of heating temperature: 180° C., pressure: 10 MPa, heating time: 3 minutes and cooling temperature: 60° C. to obtain a test piece having a thickness of 1 mm. This compression molded test piece was cut into an ultrathin cut piece with an untramicrotome. The cut piece was dyed with ruthenic acid, and observed with a transmission electron microscope (trade name: JEM-2000FX, a product of JEOL Co.).

In case of a resin composition using a core-shell latex rubber, the number of agglomerates having a diameter exceeding 1 μm in a core-shell latex rubber present on an optionally selected visual field of 10 μm×10 μm was counted. Further, continuous phase was observed with a photomicrograph.

In case of a resin composition using a thermoplastic polyurethane, phase structure of a polyurethane and particle diameter of a disperse phase were observed with a photomicrograph.

Measurement of Heat Resistance

Using an injection molded test piece, Vicat softening temperature was measured according to JIS K7206.

EXAMPLE 1

70% by weight of poly-3-hydroxybutyrate (trade name: Biocycle 1000, a product of PHB Industrial S/A) which had previously been pre-dried in an oven at 80° C. for 4 hours, and 30% by weight of a core-shell latex rubber comprising polymethyl methacrylate as a shell component and acrylic rubber as a core component (trade name: METABLEN W-450A, a product of Mitsubishi Rayon Co.) were melt extrusion mixed with a counter-rotating twin-screw extruder equipped with circular die (trade name: LABOPLAST MILL, a product of Toyo Seiki Seisakusho, resin temperature: 178° C., number of revolution: 100 rpm, use of strongly kneading type screw). An extruded strand obtained was solidified in a hot bath set at 60° C. The resulting solid strand was palletized with a strand cutter to obtain a resin composition in pellet form.

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 μm of a core-shell latex rubber present on an optionally selected visual field of 10 μm×10 μm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had high Vicat softening temperature and Izod impact strength, and thus had excellent heat resistance and impact resistance.

EXAMPLE 2

A resin composition in a pellet form was obtained in the same manner as in Example 1 above, except that 10 parts by weight of di-2-ethylhexyl phthalate (DOP) were added to 100 parts by weight of the mixture of 70% by weight of poly-3-hydroxybutyrate and 30% by weight of the core-shell latex rubber as used in Example 1.

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 μm of a core-shell latex rubber present on an optionally selected visual field of 10 μm×10 μm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had high Vicat softening temperature and Izod impact strength, and excellent heat resistance and impact resistance.

EXAMPLE 3

A resin composition in a pellet form was obtained in the same manner as in Example 1 above, except that a core-shell latex rubber in which a core component is a silicone-acrylic rubber copolymer, and a shell component is polymethyl methacrylate (trade name: METABLEN S-2001, a product of Mitsubishi Rayon Co.) was used in place of a core-shell latex rubber (trade name: METABLEN W-450A, a product of Mitsubishi Rayon Co.).

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 μm of a core-shell latex rubber present on an optionally selected visual field of 10 μm×10 μm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had high Vicat softening temperature and Izod impact strength, and excellent heat resistance and impact resistance.

EXAMPLE 4

A resin composition in a pellet form was obtained in the same manner as in Example 3 above, except that 10 parts by weight of ethyl phthalate (DEP) were added to 100 parts by weight of the mixture of 70% by weight of poly-3-hydroxybutyrate and 30% by weight of the core-shell latex rubber.

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 μm of a core-shell latex rubber present on an optionally selected visual field of 10 μm×10 μm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had high Vicat softening temperature and Izod impact strength, and excellent heat resistance and impact resistance.

EXAMPLE 5

A resin composition in a pellet form was obtained in the same manner as in Example 4 above, except that 10 parts by weight of talc (trade name: MICRO ACE P-3, surface epoxy-modified: 1%, a product of Nippon Talc Co.) were added to 100 parts by weight of the mixture of 70% by weight of poly-3-hydroxybutyrate and 30% by weight of the core-shell latex rubber.

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 μm of a core-shell latex rubber present on an optionally selected visual field of 10 μm×10 μm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had high Vicat softening temperature and Izod impact strength, and excellent heat resistance and impact resistance.

EXAMPLE 6

A resin composition in a pellet form was obtained in the same manner as in Example 3 above, except that a counter-rotating twin-screw extruder equipped with full-flighted screw was used in place of the counter-rotating twin screw extruder equipped with strongly kneading type screw.

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 μm of a core-shell latex rubber present on an optionally selected visual field of 10 μm×10 μm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had high Vicat softening temperature and Izod impact strength, and excellent heat resistance and impact resistance.

EXAMPLE 7

A resin composition in a pellet form was obtained in the same manner as in Example 1 above, except that a core-shell latex rubber in which a core component is a silicone-acrylic rubber copolymer, and a shell component is polymethyl methacrylate (trade name: METABLEN SRK200, a product of Mitsubishi Rayon Co.) was used in place of a core-shell latex rubber (trade name: METABLEN W-450A, a product of Mitsubishi Rayon Co.).

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 µm of a core-shell latex rubber present on an optionally selected visual field of 10 µm×10 µm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had high Vicat softening temperature and Izod impact strength, and excellent heat resistance and impact resistance.

COMPARATIVE EXAMPLE 1

Pellets were obtained in the same manner as in Example 1, except that extrusion was conducted using poly-3-hydroxybutyrate (trade name: Biocycle 1000, a product of PHB Industrial S/A) alone.

The pellets obtained were measured for crystallization temperature, crystalline melting temperature, and average molecular weight of a chloroform-soluble component. Further, Izod impact strength and Vicat softening temperature were measured using an injection molded test piece. The results obtained are shown in Table 1 below.

The resin obtained had low Izod impact strength, and thus had poor impact resistance.

COMPARATIVE EXAMPLE 2

A resin composition in a pellet form was obtained in the same manner as in Example 1 above, except that a core-shell latex rubber in which a core component is a styrene-butadiene copolymer rubber, and a shell component is polymethyl methacrylate (trade name: METABLEN C-223A, a product of Mitsubishi Rayon Co.) was used in place of a core-shell latex rubber (trade name: METABLEN W-450A, a product of Mitsubishi Rayon Co.).

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 µm of a core-shell latex rubber present on an optionally selected visual field of 10 µm×10 µm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had low Izod impact strength, and thus had poor impact resistance.

COMPARATIVE EXAMPLE 3

A resin composition in a pellet form was obtained in the same manner as in Example 1 above, except that the resin temperature immediately after discharge from the counter-rotating twin-screw extruder was changed 250° C. in place of 178° C.

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 µm of a core-shell latex rubber present on an optionally selected visual field of 10 µm×10 µm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had low crystallization temperature of 92° C., resulting in poor molding processability, and also had low Izod impact strength, thus having poor impact resistance.

COMPARATIVE EXAMPLE 4

A resin composition in a pellet form was obtained in the same manner as in Example 1 above, except that 30% by weight of poly-3-hydroxybutyrate and 70% by weight of the core-shell latex rubber were used in place of 70% by weight of poly-3-hydroxybutyrate and 30% by weight of the core-shell latex rubber.

The resin composition obtained was measured for crystallization temperature, crystalline melting temperature, and average molecular weight of a chloroform-soluble component. Further, Izod impact strength and Vicat softening temperature were measured using an injection molded test piece. In addition, the number of agglomerates having a diameter exceeding 1 µm of a core-shell latex rubber present on an optionally selected visual field of 10 µm×10 µm was counted by a transmission electron microscope observation using a compression molded test piece. The results obtained are shown in Table 1 below.

Further, dynamic viscoelasticity was measured using a test piece obtained by compression molding a core-shell latex rubber alone at 180° C. The measurement results obtained are shown in Table 2 below.

The resin composition obtained had low Vicat softening temperature of 70° C., and thus had poor heat resistance.

TABLE 1

| | Properties of resin | | | | | | |
|---|---|---|---|---|---|---|---|
| | Crystallization Temperature (° C.) | Crystalline Melting Point (° C.) | Weight Average Molecular Weight | Vicat Softening Temperature (° C.) | Izod Impact Strength (J/m) | Continuous Phase* | Number of Agglomerates (per 100 µm$^2$) |
| Example 1 | 137 | 177 | 370000 | 163 | 105 | PHB | 0 |
| Example 2 | 133 | 172 | 420000 | 161 | 125 | PHB | 0 |

TABLE 1-continued

| | Properties of resin | | | | | | |
|---|---|---|---|---|---|---|---|
| | Crystallization Temperature (° C.) | Crystalline Melting Point (° C.) | Weight Average Molecular Weight | Vicat Softening Temperature (° C.) | Izod Impact Strength (J/m) | Continuous Phase* | Number of Agglomerates (per 100 μm²) |
| Example 3 | 136 | 177 | 370000 | 164 | 90 | PHB | 0 |
| Example 4 | 130 | 169 | 440000 | 163 | 125 | PHB | 0 |
| Example 5 | 132 | 171 | 420000 | 165 | 75 | PHB | 0 |
| Example 6 | 137 | 177 | 370000 | 160 | 70 | Co-continuous | 8 |
| Example 7 | 137 | 178 | 370000 | 163 | 70 | PHB | 0 |
| Comparative Example 1 | 136 | 177 | 370000 | 165 | 30 | PHB | — |
| Comparative Example 2 | 137 | 177 | 370000 | 163 | 45 | PHB | 0 |
| Comparative Example 3 | 92 | 175 | 68000 | 159 | 40 | PHB | 12 |
| Comparative Example 4 | 137 | 176 | 370000 | 70 | >200 | Latex | >20 |

*PHB: Polyhydroxybutyrate polymer is continuous phase.
Latex: Core-shell latex rubber is continuous phase.

TABLE 2

| | Properties of core-shell latex rubber | | | | |
|---|---|---|---|---|---|
| | Shell Component | Core Component | Peak Temperature of Loss Tangent | Storage Elasticity at 0° C. | Maximum Value of Loss Tangent at −50 to 0° C. |
| Examples 1-2 | Methyl methacrylate | Acrylic rubber | −31 | 55 | 0.51 |
| Examples 3-6 | Methyl methacrylate | Silicone-acrylic rubber | −32 | 50 | 0.50 |
| Example 7 | Methyl methacrylate | Silicone-acrylic rubber | −30 | 480 | 0.23 |
| Comparative Example 2 | Methyl methacrylate | Styrene-butadiene rubber | −71 | 195 | 0.30 |
| Comparative Examples 3-4 | Methyl methacrylate | Acrylic rubber | −31 | 55 | 0.51 |

EXAMPLE 8

70% by weight of poly-3-hydroxybutyrate (trade name: Biocycle 1000, a product of PHB Industrial S/A) which had previously be pre-dried in an oven at 80° C. for 4 hours, and 30% by weight of an adipic acid-based thermoplastic polyurethane (trade name: MIRACTRAN E190, a product of Nippon Miractran Co., Ltd.) were melt extrusion mixed with a counter- rotating twin-screw extruder equipped with circular die (trade name: LABOPLAST MILL, a product of Toyo Seiki Seisakusho, resin temperature: 178° C., number of revolution: 100 rpm, use of strongly kneading type screw). An extruded strand obtained was solidified in a hot bath set at 60° C. The resulting sold strand was palletized with a strand cutter to obtain a resin composition in pellet form.

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had high Vicat softening temperature and Izod impact strength, and thus had excellent heat resistance and impact resistance.

EXAMPLE 9

A resin composition in a pellet form was obtained in the same manner as in Example 8 above, except that 10 parts by weight of di-2-ethylhexyl phthalate (DOP) were added to 100 parts by weight of the mixture of 70% by weight of poly-3-hydroxybutyrate and 30% by weight of the adipic acid-based thermoplastic polyurethane.

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had high Vicat softening temperature and Izod impact strength, and thus had excellent heat resistance and impact resistance.

EXAMPLE 10

A resin composition in a pellet form was obtained in the same manner as in Example 8 above, except that 10 parts by weight of talc (trade name: MICRO ACE P-3, surface epoxy-modified: 1%, a product of Nippon Talc Co.) were added to 100 parts by weight of the mixture of 70% by weight of poly-3-hydroxybutyrate and 30% by weight of the adipic acid-based thermoplastic polyurethane.

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had high Vicat softening temperature and Izod impact strength, and thus had excellent heat resistance and impact resistance.

EXAMPLE 11

A resin composition in a pellet form was obtained in the same manner as in Example 8 above, except that a polycaprolacton-based thermoplastic polyurethane (trade name: MIRACTRAN E585, a product of Nippon Miractran Co., Ltd.) was used in place of the adipic acid-based thermoplastic polyurethane (trade name: MIRACTRAN E190, a product of Nippon Miractran Co., Ltd.)

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had high Vicat softening temperature and Izod impact strength, and thus had excellent heat resistance and impact resistance.

EXAMPLE 12

A resin composition in a pellet form was obtained in the same manner as in Example 8 above, except that an adipic acid-based thermoplastic polyurethane having different diol component (trade name: MIRACTRAN E685, a product of Nippon Miractran Co., Ltd.) was used in place of the adipic acid-based thermoplastic polyurethane (trade name: MIRACTRAN E190, a product of Nippon Miractran Co., Ltd.)

The resin composition obtained was measured for crystallization temperature, crystalline melting temperature, and average molecular weight of a chloroform-soluble component. Further, Izod impact strength and Vicat softening temperature were measured using an injection test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had high Vicat softening temperature and Izod impact strength, and thus had excellent heat resistance and impact resistance.

COMPARATIVE EXAMPLE 5

A resin composition in a pellet form was obtained in the same manner as in Example 8 above, except that a polyether-based thermoplastic polyurethane (trade name: MIRACTRAN E385, a product of Nippon Miractran Co., Ltd.) was used in place of the adipic acid-based thermoplastic polyurethane (trade name: MIRACTRAN E190, a product of Nippon Miractran Co., Ltd.)

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had low Izod impact strength, and thus had poor impact resistance.

COMPARATIVE EXAMPLE 6

A resin composition in a pellet form was obtained in the same manner as in Example 8 above, except that a different adipic acid-based thermoplastic polyurethane (trade name: MIRACTRAN E198, a product of Nippon Miractran Co., Ltd.) was used in place of the adipic acid-based thermoplastic polyurethane (trade name:. MIRACTRAN E190, a product of Nippon Miractran Co., Ltd.)

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had low Izod impact strength, and thus had poor impact resistance.

COMPARATIVE EXAMPLE 7

A resin composition in a pellet form was obtained in the same manner as in Example 8 above, except that the resin temperature immediately after discharge from the counter-rotating twin-screw extruder was changed 250° C. in place of 178° C.

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had low Izod impact strength, and thus had poor impact resistance.

COMPARATIVE EXAMPLE 8

A resin composition in a pellet form was obtained in the same manner as in Example 8 above, except that 30% by weight of poly-3-hydroxybutyrate and 70% by weight of the thermoplastic polyurethane were used in place of 70% by weight of poly-3-hydroxybutyrate and 30% by weight of the thermoplastic polyurethane.

The resin composition obtained was measured for crystallization temperature, crystalline melting temperature, and average molecular weight of a chloroform-soluble component. Further, Izod impact strength and Vicat softening temperature were measured using an injection molded test piece. In addition, a transmission electron microscope observation was conducted using a compression molded test piece. The results obtained are shown in Table 3 below.

Further, glass transition temperature and surface hardness of the thermoplastic polyurethane alone are shown in Table 4 below.

The resin composition obtained had low Vicat softening temperature of 68° C., and thus had poor heat resistance.

TABLE 4-continued

Properties of thermoplastic polyurethane

| | Soft Segment | Surface Hardness JIS A | Glass Transition Temperature (° C.) |
|---|---|---|---|
| Example 11 | Polycaprolactone | 85 | −48 |
| Example 12 | Adipic acid polyester Diol component: pentane diol | 85 | −48 |
| Comparative Example 5 | Polyether | 85 | −58 |
| Comparative Example 6 | Adipic acid polyester Diol component: ethylene glycol, butylene glycol | 98 | −39 |
| Comparative Examples 7-8 | Adipic acid polyester Diol component: ethylene glycol, butylene glycol | 90 | −43 |

It should further be apparent to those skilled in the art that various changes in form and detail of the invention as shown and described above may be made. It is intended that such changes be included within the spirit and scope of the claims appended hereto.

This application is based on Japanese Patent Application No. 2004-328804 filed Nov. 12, 2004, the disclosure of which is incorporated herein by reference in its entirety.

TABLE 3

Properties of resin

| | Crystallization Temperature (° C.) | Crystalline Melting Point (° C.) | Weight Average Molecular weight | Vicat Softening Temperature (° C.) | Izod Impact Strength (J/m) | Continuous Phase* | Average Particle Diameter of Disperse Phase (μm) |
|---|---|---|---|---|---|---|---|
| Example 8 | 137 | 177 | 370000 | 164 | 400 | PHB | 1 |
| Example 9 | 133 | 172 | 420000 | 162 | 440 | PHB | 1 |
| Example 10 | 135 | 176 | 400000 | 156 | 320 | PHB | 1 |
| Example 11 | 136 | 176 | 360000 | 163 | 80 | PHB | 0.5 |
| Example 12 | 137 | 177 | 380000 | 163 | 70 | PHB | 1.5 |
| Comparative Example 5 | 136 | 177 | 370000 | 165 | 40 | PHB | 2 |
| Comparative Example 6 | 137 | 177 | 350000 | 164 | 45 | PHB | 1 |
| Comparative Example 7 | 91 | 175 | 69000 | 159 | 40 | PHB | 5 |
| Comparative Example 8 | 137 | 174 | 370000 | 68 | >500 | TPU | — |

*PHB: Polyhydroxybutyrate polymer is continuous phase.
TPU: Thermoplastic polyurethane is continuous phase.

TABLE 4

Properties of thermoplastic polyurethane

| | Soft Segment | Surface Hardness JIS A | Glass Transition Temperature (° C.) |
|---|---|---|---|
| Examples 8-10 | Adipic acid polyester Diol component: ethylene glycol, butylenes glycol | 90 | −43 |

What is claimed is:

1. A resin composition comprising:

50-99% by weight of a poly-3-hydroxybutyrate polymer, and 50-1% by weight of a thermoplastic polyurethane produced using:

adipic acid polyester, wherein the polyester is obtained from ethylene glycol, butylene glycol and adipic acid, and an isocyanate, and satisfying the following requirements (a) and (b):

(a) a glass transition temperature when heated from −100° C. at a temperature rising rate of 10° C./min by a differential scanning calorimeter is −30 to −50° C.; and (b) JIS A surface hardness is 60-95, the resin composition satisfying the following requirements (c) and (d):

(c) a crystallization temperature when heated from room temperature to 180° C. at a temperature rising rate of 80° C./min by a differential scanning calorimeter, maintained at 180° C. for 1 minute, and then cooled at a temperature lowering rate of 10° C./min is 110-170° C.; and (d) a weight average molecular weight (Mw) in terms of polystyrene conversion when a component soluble in chloroform at 60° C. as measured with gel permeation chromatography is 100,000-3,000,000.

2. The resin composition as claimed in claim 1, further comprising a plithalic acid-based plasticizer in an amount of 0.1-30 parts by weight per 100 parts by weight of the sum of the poly-3-hydroxybutyrate polymer and the thermoplastic polyurethane.

3. The resin composition as claimed in claim 1, wherein a sea-island structure is formed such that the poly-3-hydroxybutyrate polymer forms a continuous phase and the thermoplastic polyurethane forms a disperse phase, and the disperse phase has an average particle diameter of 0.1-3 µm.

4. A method for producing a resin composition comprising:
melt mixing 50-99% by weight of a poly-3-hydroxybutyrate polymer, and 50-1% by weight of a thermoplastic polyurethane produced using:

adipic acid polyester, wherein the polyester is obtained from ethylene glycol, butylene glycol and adipic acid, and an isocyanate, and satisfying the following requirements (a) and (b):

(a) a glass transition temperature when heated from −100° C. at a temperature rising rate of 10° C./min by a differential scanning calorimeter is −30 to −50° C.; and (b) JIS A surface hardness is 60-95, with an extruder, and discharging the resulting molten mixture from a die at a molten resin temperature of 160-185° C.

5. The resin composition as claimed in claim 2, wherein a sea-island structure is formed such that the poly-3-hydroxybutyrate polymer forms a continuous phase and the thermoplastic polyurethane using forms a disperse phase, and the disperse phase has an average particle diameter of 0.1-3 µm.

* * * * *